(12) United States Patent
Stopp et al.

(10) Patent No.: US 9,079,506 B2
(45) Date of Patent: Jul. 14, 2015

(54) METHOD FOR CONTROLLING A HYBRID VEHICLE

(75) Inventors: Ralf Stopp, Buehl (DE); Michael Bogner, Eckental (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 673 days.

(21) Appl. No.: 12/843,234

(22) Filed: Jul. 26, 2010

(65) Prior Publication Data

US 2011/0022258 A1 Jan. 27, 2011

(30) Foreign Application Priority Data

Jul. 27, 2009 (DE) .......................... 10 2009 034 809

(51) Int. Cl.
| | | |
|---|---|---|
| *B60W 20/00* | (2006.01) | |
| *B60W 10/06* | (2006.01) | |
| *B60L 11/18* | (2006.01) | |
| *B60K 6/46* | (2007.10) | |
| *B60L 11/12* | (2006.01) | |
| *F02N 11/08* | (2006.01) | |

(52) U.S. Cl.
CPC .................. *B60L 11/187* (2013.01); *B60K 6/46* (2013.01); *B60L 11/123* (2013.01); *B60L 11/126* (2013.01); *B60L 11/1861* (2013.01); *B60L 11/1872* (2013.01); *B60W 10/06* (2013.01); *F02N 11/084* (2013.01); *B60L 2240/34* (2013.01); *B60L 2240/647* (2013.01); *B60L 2240/80* (2013.01); *B60W 20/00* (2013.01); *B60W 2510/244* (2013.01); *B60W 2510/246* (2013.01); *B60W 2550/147* (2013.01); *F02D 2200/701* (2013.01); *F02N 2200/061* (2013.01); *F02N 2200/064* (2013.01); *Y02T 10/48* (2013.01); *Y02T 10/6217* (2013.01); *Y02T 10/7005* (2013.01); *Y02T 10/705* (2013.01); *Y02T 10/7044* (2013.01); *Y02T 10/7077* (2013.01); *Y02T 10/7291* (2013.01); *Y02T 90/16* (2013.01)

(58) Field of Classification Search
CPC ...................................................... B60W 20/00
See application file for complete search history.

(56) References Cited

U.S. PATENT DOCUMENTS

| | | | | |
|---|---|---|---|---|
| 6,137,250 | A * | 10/2000 | Hirano et al. ................. | 318/376 |
| 6,332,603 | B1 * | 12/2001 | Rotsch et al. ............ | 267/140.11 |
| 7,377,344 | B2 * | 5/2008 | Barske ....................... | 180/65.28 |
| 7,438,051 | B2 * | 10/2008 | Wachtendorf et al. ........ | 123/446 |
| 8,229,612 | B2 * | 7/2012 | Itoh et al. ....................... | 701/22 |
| 2006/0116797 | A1 * | 6/2006 | Moran ............................ | 701/22 |
| 2007/0255463 | A1 * | 11/2007 | Kikuchi ......................... | 701/22 |
| 2010/0204896 | A1 * | 8/2010 | Biondo et al. .................. | 701/93 |
| 2010/0245069 | A1 * | 9/2010 | Noro .............................. | 340/441 |
| 2010/0280735 | A1 * | 11/2010 | Moritz et al. ................. | 701/102 |

* cited by examiner

*Primary Examiner* — Ariel Yu
(74) *Attorney, Agent, or Firm* — Lucas & Mercanti, LLP

(57) ABSTRACT

A method for controlling a hybrid motor vehicle which has an electromotive internal combustion engine, which is operated by an electric accumulator and is operatively connected to a generator for the charging of the accumulator, and a control unit for controlling the drive unit, in particular the internal combustion engine as a function of the charge state of the accumulator. So that the internal combustion engine is operated advantageously, in addition to a control process as a function of the charge state of the accumulator, in order to protect the control unit and/or for the effective operation thereof, the internal combustion engine is controlled, at least as a function of a retrieved continuous power rating of the accumulator, a temperature of the accumulator, of vibrations occurring in the motor vehicle and/or of a downtime of the internal combustion engine.

23 Claims, 1 Drawing Sheet

METHOD FOR CONTROLLING A HYBRID VEHICLE

Figure 1:
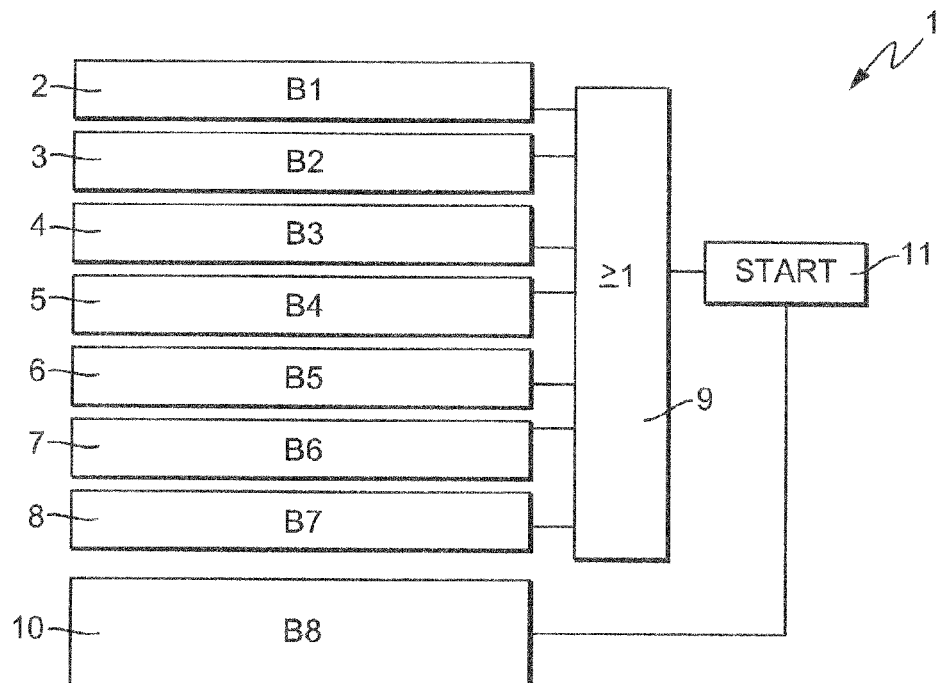

This application claims the priority DE 10 2009 034 809.3, filed Jul. 27, 2009, which is incorporated by reference herein.

The invention relates to a method for controlling a hybrid motor vehicle having an electromotive internal combustion engine, which is operated by an electric accumulator and is operatively connected to a generator for charging the accumulator, and to a control unit for controlling said accumulator.

Motor vehicles are known with a pure electric drive in which an electric motor drives at least one axle of the motor vehicle, and is fed by an accumulator which is recharged at a mains socket.

Such motor vehicles have a comparatively small range and, in particular, are not failsafe given an unpredictable altitude profile.

For this reason, what are referred to as serial hybrid vehicles of the generic type are proposed in which an internal combustion engine is arranged in series with the electric motor, which internal combustion engine is primarily coupled to a generator (REA, Range Extender Aggregate) which can charge the accumulator during travel and, if appropriate, assists the electric motor in driving the motor vehicle. The control of the internal combustion engine is carried out here as a function of the charge state of the accumulator by virtue of the fact that the internal combustion engine is started when the charge state is poor, and the accumulator is charged with electrical energy by the generator which is driven by the internal combustion engine. It has become apparent here that controlling the internal combustion engine solely as a function of the charge state can cause, on the one hand, an uncomfortable operating mode and, on the other hand, a damaging operating mode both for the internal combustion engine and for the accumulator.

The object therefore arises of controlling the controller of an internal combustion engine in a serial hybrid vehicle of the generic type in such a way that a comfortable, permanent operating mode of the accumulator and of the internal combustion engine is made possible.

The object is achieved by a method for controlling a hybrid motor vehicle having an electromotive internal combustion engine, which is operated by an electric accumulator and is operatively connected to a generator for the charging of the accumulator, and a control unit for controlling the drive unit, in particular the internal combustion engine as a function of a charge state of the accumulator, wherein the internal combustion engine is controlled as a function of at least one of the following parameters:

a retrieved continuous power rating of the accumulator,
a temperature of the accumulator,
of vibrations occurring in the motor vehicle,
a downtime of the internal combustion engine.

By including parameters which protect the accumulator and/or the internal combustion engine against damaging or uncomfortable operating states, the comfort and the fatigue resistance of serial hybrid vehicles of the generic type can be increased.

In one specific exemplary embodiment, at an optimum operating point the internal combustion engine can be used exclusively for driving the generator, and an additional kinetic drive for assisting the electromotive drive can be dispensed with, with the result that the internal combustion engine can correspondingly be configured with low power, which is dimensioned to be sufficient to make available the maximum charging energy generated by the generator driven by the internal combustion engine. In other exemplary embodiments, the internal combustion engine can assist the electromotive drive. The power can be configured here to the effect that maximum driving distances of the motor vehicle can be achieved during a hybrid operating mode in a combined drive unit composed of an electric motor and the internal combustion engine.

In a manner known per se, the internal combustion engine can be operated as a function of the charge state of the accumulator by virtue of the fact that the internal combustion engine is started below a predefined value for the charge state of the accumulator. In a parallel control routine of the control unit, the internal combustion engine can be operated as a function of a continuous power rating of the electric motor which functions as the drive unit, by virtue of the fact that, for example, the internal combustion engine is started as a function of a predefined value of a period of continuous loading of the accumulator. In this context, the charging of the accumulator can be forced given high loading of the accumulator and high power of the electric motor, by virtue of the fact that the internal combustion engine is started and is used in the charging mode by driving the generator, and not to provide kinetic support to the electric motor, or only to provide kinetic support to the electric motor by means of a subordinate power in the travel mode. In this context, the value of the period of continuous loading above a predefined value for an electrical variable of the accumulator can be determined, for example the current which is drawn by the electric motor, the voltage drop which is brought about at the accumulator by the electric motor, the power which is demanded by the electric motor or the like. The accumulator may be a conventional lead accumulator, a lithium-ion accumulator, a serial and/or parallel combination of a plurality of units of these or of other electrochemically operating accumulators or some other rechargeable electrical storage means, for example a high power capacitor or a combination of a plurality thereof.

In one control routine of the control unit there may be provision for the internal combustion engine to be started and therefore the accumulator to be charged by the generator or for the electric motor to be deactivated and therefore the discharging of the accumulator to be stopped with the motor vehicle being operated only by means of the internal combustion engine, if the accumulator could not be operated within a predefined temperature range which corresponds to a preferred operating temperature of the accumulator. The accumulator is therefore not discharged or charged when its temperature does not correspond to its preferred operating temperature. In this way, the service life of the accumulator is advantageously prolonged.

According to a further inventive concept, the accumulator can be held in the predefined temperature range by means of cooling or heating by the operation of the internal combustion engine, in particular in conjunction with the operation of the internal combustion engine which is controlled, such as started or deactivated, in a way which corresponds to this purpose. In this context, the airflow or, for example, a Peltier element can serve to perform cooling, and an electric heater, operated by electrical energy can serve to heat the accumulator.

It has also been found that vibrations acting on the motor vehicle, for example due to travel along poorly paved roadways or the like, have an adverse effect in particular on the deactivated internal combustion engine. It is therefore possible, for example, for bearing damage to occur. In order to detect the vibrations acting on the motor vehicle, one or more acceleration sensors can be used. The evaluation of the detected signals can take place in the control unit. The signals of acceleration sensors used at other locations of the motor vehicle and evaluated, if appropriate, can also be employed by virtue of the fact that the corresponding data which are kept ready on a databus such as a CAN bus, are employed. In a corresponding routine, the internal combustion engine can be started when a predefined value of vibrations acting on the motor vehicle, preferably on the internal combustion engine, is overshot.

Furthermore, the internal combustion engine may be damaged if it is not operated over a longer period of time. For example, it can no longer be started with the desired comfort by virtue of the fact that, for example, the optimum operating temperature thereof is not maintained. Furthermore, corrosion damage due to condensed water and other similar influences may have negative effects. According to the inventive concept, there is therefore provision for the internal combustion engine to be started within a predefined value of a downtime. It has proven advantageous here it after the internal combustion engine has been activated, it is operated continuously for a predefined operating period. If the internal combustion engine is actuated with a sufficient charge state of the accumulator in such a case or when damaging vibrations are occurring, or for other reasons, it is possible, given a serial arrangement of the internal combustion engine with respect to the electric motor, that the motor vehicle is driven in an assisting fashion or solely by the internal combustion engine and/or that the internal combustion engine can heat an excessively cooled passenger compartment electrically by driving the generator or cool an excessively heated passenger compartment by virtue of the fact that a Peltier element is operated by the generator or an air conditioning compressor is driven kinetically by the internal combustion engine.

It has also proven advantageous if the motor vehicle is controlled as a function of detection devices of a selected section of route by virtue of the fact that the electromotive and/or the internal combustion engine are subjected to route-typical operating modes according to the section of route. The detection devices may be in this context a navigation system, a traffic signaling device, a weather forecast device and/or the like, with the result that a section of a route can be modeled and calculated in advance before a journey is started and, if appropriate, updated during the journey. For example, time intervals for the purely electromotive drive, pure internal combustion engine drive and/or hybrid drive of the motor vehicle can be defined at the start of the journey by the control unit as a function of the section of the route determined in this way, by virtue of the fact that before sections of a route with a positive gradient the internal combustion engine operates the generator and electrical energy is therefore stored, and the generator is operated in a recovering fashion on sections of route with a negative gradient, the motor vehicle is operated electrically during slow travel such as city travel or in congestion and/or during pauses the internal combustion engine drives the generator in order to charge the at least partially discharged accumulator.

Furthermore, the control unit can set different operating states which provide a purely electromotive driving state, a driving state exclusively by means of the internal combustion engine and/or a hybrid driving state with a drive by means of the electric motor and by means of the internal combustion engine. For example, given a low charge state of the accumulator, a combined charging mode of the accumulator by means of the internal combustion engine and an assisting driving state by means of the internal combustion engine can be selected. This means that the vehicle drives during the charging of the accumulator. The same procedure can be provided given a high continuous power rating of the accumulator by virtue of the fact that a combined charging mode of the accumulator by means of the internal combustion engine and a driving state, for example hybrid, purely electromotive or exclusively by means of the internal combustion engine are selected.

In exclusive operation of the internal combustion engine for driving the generator, the electric motor is the only drive. If the internal combustion engine assists the electric motor in driving, the power which is generated by the internal combustion engine is used primarily for the driving state and the electric energy which is generated in addition to this is used to charge the accumulator.

In a driving state in which the electric motor is exclusively providing the drive, and at a temperature of the accumulator outside a predefined operating temperature of the accumulator, electrical energy which is made available by the generator for the travel mode of the motor vehicle can be selected exclusively, and it is not possible to start a charging process until the accumulator is within the predefined operating temperature again. Given an internal combustion engine which has been started owing to the vibrations occurring in the motor vehicle being overshot, the generator can be operated exclusively in the charging state. Given an internal combustion engine which is started owing to a downtime being overshot, the generator can also be operated exclusively in the charge state.

Figure 2:
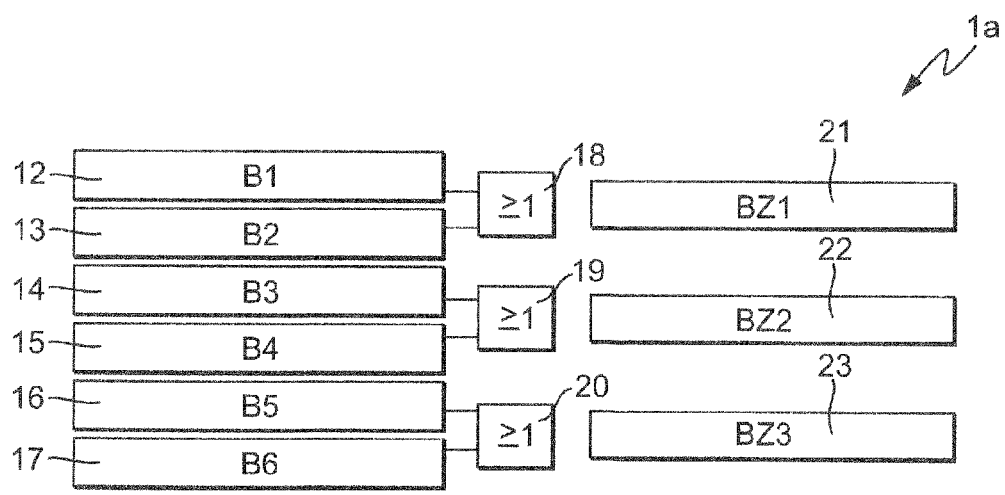

The invention is explained in more detail with reference to the exemplary embodiments illustrated in FIGS. 1 and 2. Of said figures:

FIG. 1 shows a routine for operating a motor vehicle with an internal combustion engine operated an electric motor in a steady state at an optimum operating point; and FIG. 2 shows a routine for operating a motor vehicle with an internal combustion engine operated an electric motor in a steady state at a plurality of operating point.

FIG. 1 shows a routine 1 for controlling an internal combustion engine in a motor vehicle with an electromotive drive unit. In the individual blocks 2, 3, 4, 5, 6, 7, 8, the conditions B1, B2, B3, B4, B5, B6, B7 for the starting of the internal combustion engine in block 11 are predefined, and their presence is checked in the decision field. If the corresponding condition B1, B2, B3, B4, B5, B6, B7 is present, the internal combustion engine is started. The conditions are in particular, B1 charge state of the accumulator too low,
B2 continuous power rating or peak power of the accumulator too high,
B3 operating temperature of the accumulator too high,
B4 operating temperature of the accumulator too low,
B5 vibrations input into the motor vehicle are too high,
B6 downtime of the internal combustion engine too high,
B7 temperature of the passenger compartment too low.

In block 10, different conditions, the section-of-route-dependent conditions B8 which are updated before a journey is started, and, if appropriate, during the journey, and which cause the internal combustion engine to be started directly in block 11.

FIG. 2 shows the routine 1a as a flowchart in which in the blocks 12, 13, 14, 15, 16, 17 the conditions B1, B2, B3, B4, B5, B6 are defined, said conditions being formed in particular as follows:

B1 charge state of the accumulator too low,
B2 continuous power rating or peak power of the accumulator too high,
B3 operating temperature of the accumulator too high,
B4 operating temperature of the accumulator too low,
B5 vibrations which are input into the motor vehicle are too high, B6 downtime of the internal combustion engine too high, and the fulfillment or presence of said conditions is checked in the decision fields 18, 19, 20. If the conditions B1, B2, B3, B4, B5, B6 are present, different driving states such as operating states BZ1, BZ2, BZ3 are respectively set in blocks 21, 22, 23. If, for example, at least one of the conditions B1 or B2 with an excessively low charge state of the accumulator and/or an excessively high continuous power rating are met, in the operating state BZ1 the internal combustion engine is started with a charging mode of the accumulator by means of the generator and a travel mode in which some of the electrical energy which is generated by the generator which is driven by the internal combustion engine is made available to the electric motor for propelling the motor vehicle. If one of the conditions B3, B4, which define an excessively high or excessively low operating temperature of the accumulator, is met, in the operating state BZ2 the internal combustion engine is started and the electrical energy generated by the generator which is driven by the internal combustion engine is made available exclusively to the electric motor for the travel mode of the motor vehicle. If the vibrations which are input into the motor vehicle according to the condition B5 are too high and/or if the downtime of the internal combustion engine in condition B6 is too high, in the operating state BZ3 the internal combustion engine is started and the generator which is driven thereby makes available the generated energy exclusively for charging the accumulator.

LIST OF REFERENCE SYMBOLS

1 Routine
1a Routine
2 Block
3 Block
4 Block
5 Block
6 Block
7 Block
8 Block
9 Decision field
10 Block
11 Block
12 Block
13 Block
14 Block
15 Block
16 Block
17 Block
18 Decision field
19 Decision field
20 Decision field
21 Block
22 Block
23 Block
B1 Condition
B2 Condition
B3 Condition
B4 Condition
B5 Condition
B6 Condition
B7 Condition
B8 Condition
BZ1 Operating state
BZ2 Operating state
BZ3 Operating state

The invention claimed is:

1. A method for controlling a hybrid motor vehicle having an electromotive internal combustion engine, which is operated by an electric accumulator and is operatively connected to a generator for charging of the accumulator, and a control unit for controlling a drive unit as a function of a charge state of the accumulator, wherein starting the internal combustion engine is controlled at least as a function of vibrations occurring in the motor vehicle,
wherein when a predefined value of vibrations acting on the motor vehicle is overshot, the internal combustion engine is started and, when the internal combustion engine has been started on a basis of vibrations occurring in the motor vehicle having been overshot, the generator is operated exclusively in a charging state.

2. The method of claim 1, wherein at an optimum operating point the internal combustion engine is used exclusively for driving the generator.

3. The method of claim 1, wherein the internal combustion is started below a predefined value for the charge state of the accumulator.

4. The method of claim 1, wherein the internal combustion engine is started when a determined value of the period of continuous loading is above the predefined value for an electrical variable of the accumulator.

5. The method of claim 1, wherein the accumulator is discharged or charged within a predefined temperature range.

6. The method of claim 5, wherein the accumulator is held in the predefined temperature range by means of cooling or heating.

7. The method of claim 6, wherein the accumulator is held in the predefined temperature range by means of electrical energy which is generated by the internal combustion engine and the generator.

8. The method of claim 1, wherein vibrations acting on the motor vehicle are detected by means of an acceleration sensor and evaluated in the control unit.

9. The method of claim 1, wherein the internal combustion engine is started within a predefined value of a downtime thereof.

10. The method of claim 9, wherein, after the internal combustion engine has been activated, the internal combustion engine is operated continuously for a predefined operating period.

11. The method of claim 9, wherein during a time when the internal combustion engine, which is activated to prevent the predefined value of the downtime from being overshot, the internal combustion engine electrically heats an excessively cooled passenger compartment by driving the generator or cools an excessively heated passenger compartment.

12. The method of claim 1, wherein the motor vehicle is controlled as a function of detection devices of a selected section of route by virtue of a fact that the electromotive and/or the internal combustion engine are subjected to route-typical operating modes according to a section of route.

13. The method of claim 12, wherein at least one of the detection devices comprising a navigation system, a traffic signaling device, a weather forecast device is used.

14. The method of claim 12, wherein time intervals for the purely electromotive drive, pure internal combustion engine drive and/or hybrid drive of the motor vehicle are defined at a start of a journey by the control unit as a function of the section of route.

15. The method of claim 12, wherein before a section of the route with a positive gradient the internal combustion engine operates the generator.

16. The method of claim 12, wherein the generator is operated in a recovering fashion on the section of the route with a negative gradient.

17. The method of claim 12, wherein during pauses in travel the internal combustion engine drives the generator.

18. The method of claim 1, wherein the motor vehicle is operated electrically during slow travel.

19. The method of claim 1, wherein, when the accumulator is in a low charge state, a combined charging mode of the accumulator by means of the internal combustion engine and a driving state are selected.

20. The method of claim 19, wherein the generator power, which is generated by the internal combustion engine, is used for the driving state as far as necessary, and the electrical energy, which is generated in addition to the generator power, is used to charge the accumulator.

21. The method of claim 1, wherein, in a case of a high continuous power rating of the accumulator, a combined charging mode of the accumulator by means of the internal combustion engine and a driving state are selected.

22. The method of claim 1, wherein, when a temperature of the accumulator is exclusively outside a predefined operating temperature of the accumulator, a travel mode of the motor vehicle is selected and a charging process is not started until the accumulator within the predefined operating temperature again.

23. The method of claim 1, wherein, when the internal combustion has been started owing to a downtime having been overshot, the generator is operated exclusively in a charging state.

* * * * *